(12) United States Patent
Okuno et al.

(10) Patent No.: US 8,385,743 B2
(45) Date of Patent: Feb. 26, 2013

(54) CHANNEL ALLOCATION METHOD FOR MULTI-CHANNEL OPTICAL TRANSMISSION AND OPTICAL TRANSMISSION SYSTEM UTILIZING THE METHOD

(75) Inventors: Toshiaki Okuno, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 3257 days.

(21) Appl. No.: 09/781,564

(22) Filed: Feb. 13, 2001

(65) Prior Publication Data

US 2001/0024304 A1   Sep. 27, 2001

(30) Foreign Application Priority Data

Feb. 14, 2000   (JP) .............................. P2000-035208

(51) Int. Cl.
*H04J 14/02* (2006.01)
(52) U.S. Cl. .................. 398/83; 398/81; 398/95
(58) Field of Classification Search .............. 398/14–38, 398/81–88, 91–95, 119, 120, 158, 194, 203–204, 398/124
See application file for complete search history.

(56) References Cited

U.S. PATENT DOCUMENTS

| | | | | |
|---|---|---|---|---|
| 5,140,456 A | * | 8/1992 | Huber ....................... | 359/341.33 |
| 5,218,608 A | * | 6/1993 | Aoki ................................ | 372/6 |
| 5,430,572 A | * | 7/1995 | DiGiovanni et al. ..... | 359/341.33 |
| 5,563,733 A | * | 10/1996 | Mitsuda et al. ............ | 359/337.1 |
| 5,623,362 A | * | 4/1997 | Mitsuda et al. .......... | 359/341.33 |
| 5,706,124 A | * | 1/1998 | Imoto et al. ................. | 359/337.1 |
| 5,745,283 A | * | 4/1998 | Inagaki et al. ............ | 359/337.13 |
| 5,831,754 A | * | 11/1998 | Nakano .......................... | 398/158 |
| 5,933,552 A | * | 8/1999 | Fukushima et al. ............ | 385/24 |
| 5,986,782 A | * | 11/1999 | Alexander et al. .............. | 398/26 |
| 6,028,698 A | * | 2/2000 | Ogoshi et al. ............. | 359/341.33 |
| 6,038,061 A | * | 3/2000 | Sugaya ......................... | 359/337 |

(Continued)

FOREIGN PATENT DOCUMENTS

| | | |
|---|---|---|
| JP | 7-177097 | 7/1995 |
| JP | 7-231300 | 8/1995 |

(Continued)

OTHER PUBLICATIONS

Japanese Office Action issued in Patent Application No. 2000-035208 dated on Jul. 1, 2008.

*Primary Examiner* — Dzung Tran
(74) *Attorney, Agent, or Firm* — McDermott Will & Emery LLP (57) ABSTRACT

Signal wavelengths $\lambda_1$, $\lambda_2$, $\lambda_3$ of signal light components multiplexed at signal multiplexing sections 31, 41, 51 of multiplexing stations 3, 4, 5 installed on the input end side of an EDFA 2 on an optical transmission line 1 are set such that the wavelength-dependent noise figure of EDFA 2 successively decreases from the signal wavelength $\lambda_1$ multiplexed at the signal multiplexing section 31 closest to the input end of EDFA 2 to $\lambda_2$ and $\lambda_3$. On the other hand, the transmission length of individual signal light component before being fed into the EDFA 2 is the shortest in the signal light component at $\lambda_1$ and successively increases at $\lambda_2$ and $\lambda_3$. Thus, the order of magnitude of input signal light power is the same as the order of highness of noise figure in EDFA 2, whereby fluctuations in S/N ratio in the resulting amplified light are reduced.

18 Claims, 7 Drawing Sheets

U.S. PATENT DOCUMENTS

| | | | |
|---|---|---|---|
| 6,233,076 B1 * | 5/2001 | Iwata et al. | 398/14 |
| 6,359,728 B1 * | 3/2002 | Angellieri et al. | 359/345 |
| 6,369,938 B1 * | 4/2002 | Sugaya et al. | 359/341.42 |
| 6,404,525 B1 * | 6/2002 | Shimomura et al. | 398/82 |
| 6,437,888 B1 * | 8/2002 | Grasso et al. | 398/82 |
| 6,466,344 B2 * | 10/2002 | Shimomura et al. | 398/82 |
| 6,490,064 B1 * | 12/2002 | Sakamoto et al. | 398/81 |
| 6,490,387 B2 * | 12/2002 | Kosaka et al. | 385/24 |
| 6,599,039 B1 * | 7/2003 | Nakazato | 398/25 |

FOREIGN PATENT DOCUMENTS

| | | |
|---|---|---|
| JP | 8116112 | 5/1996 |
| JP | 9-5212 | 1/1997 |
| JP | 10163554 | 6/1998 |
| JP | 11055700 | 2/1999 |

* cited by examiner

CHANNEL ALLOCATION METHOD FOR MULTI-CHANNEL OPTICAL TRANSMISSION AND OPTICAL TRANSMISSION SYSTEM UTILIZING THE METHOD

BACKGROUND OF THE INVENTION

1. Field of the Invention

The present invention relates to a wavelength division multiplexing optical transmission system, having an optical amplifier, for transmitting multiple-wavelength signal light.

2. Related Background Art

From social needs at the advent of highly information-oriented society, research and development related to large-capacity, high-speed communications such as image communications, and long-distance communications such as international communications, using optical fiber transmission systems, are in vogue. Here, wavelength division multiplexing (WDM) transmission systems, which carry out high-speed, large-capacity optical communications by transmitting multiple-wavelength signal light (a plurality of signal light components having wavelengths different from each other) through optical fiber lines, have been under research and development as those responding to the rapid increase in demands for communications due to the Internet and the like in recent years.

Such a wavelength division multiplexing transmission system uses an optical amplifier such as an erbium-doped fiber amplifier (EDFA) in order to compensate for the transmission loss incurred upon transmitting multiple-wavelength signal light over a long distance. In the optical amplifier, pumping light having a predetermined wavelength is supplied to a silica type optical waveguide doped with a rare-earth element such as Er mentioned above, Pr, or Nd (e.g., erbium-doped fiber; EDF), the signal light fed into this optical waveguide is optically amplified, and thus amplified signal light is outputted. Semiconductor optical amplifiers and the like are also employed as the optical amplifier.

SUMMARY OF THE INVENTION

Known as a wavelength division multiplexing optical transmission system is a multi-drop system in which a plurality of signal light components having wavelengths different from each other are transmitted through a single optical transmission line while successively being multiplexed or demultiplexed at respective signal multiplexing or demultiplexing sections. Examples of conventional multi-drop type optical transmission systems and methods are disclosed in Japanese Patent Application Laid-Open No. HEI 7-177097 and 7-231300.

In the case where an optical amplifier is installed on the optical transmission line of such a multi-drop type wavelength division multiplexing transmission system, a plurality of signal multiplexing sections are installed in the optical transmission line connected to the input side of the optical amplifier, whereby multiple-wavelength light including signal light components having wavelengths different from each other multiplexed at the individual signal multiplexing sections is amplified by the optical amplifier. Here, the attenuation of signal light caused by optical transmission depends on the transmission length, whereas the respective transmission lengths by which the signal light components multiplexed at their corresponding signal multiplexing sections are transmitted until they are fed into the optical amplifier vary depending on the positions where the signal multiplexing sections are installed. As a consequence, the S/N ratio of signal light in the output of optical amplifier may vary among the individual signal light components.

In view of the problem mentioned above, it is an object of the present invention to provide an optical transmission system and method in which fluctuations in S/N ratio among signal light components of multiple-wavelength signal light amplified by an optical amplifier on an optical transmission line are reduced.

For achieving such an object, the present invention provides an optical transmission system comprising: (1) an optical transmission line through which a plurality of signal light components having wavelengths different from each other included in a predetermined wavelength band are transmitted; (2) an optical amplifier, installed on the optical transmission line, having a wavelength-dependent noise figure; and (3) a plurality of multiplexing stations each constituted by a signal multiplexing section installed on the optical transmission line connected to an input end side of the optical amplifier, and at least one signal light outputting means for outputting a signal light component multiplexed at the signal multiplexing section; wherein (4), between two of the multiplexing stations adjacent each other, the signal light outputting means of the multiplexing station disposed upstream in a signal light propagating direction outputs a signal light component having a signal wavelength set so as to yield a noise figure lower than that of the signal wavelength of a signal light component outputted from the signal light outputting means of the multiplexing station disposed downstream.

Also, the present invention provides an optical transmission method applied to an optical transmission system comprising: (1) an optical transmission line through which a plurality of signal light components having wavelengths different from each other included in a predetermined wavelength band are transmitted; (2) an optical amplifier, installed on the optical transmission line, having a wavelength-dependent noise figure; and (3) a plurality of signal multiplexing sections installed on the optical transmission line connected to an input end side of the optical amplifier; wherein (4), between two of the signal multiplexing sections adjacent each other, a signal light component having a signal wavelength with a noise figure lower than that of the signal wavelength of a signal light component multiplexed at the signal multiplexing section disposed downstream in a signal light propagating direction is selectively assigned as a signal light component multiplexed at the signal multiplexing section disposed upstream.

Taking account of the fact that the noise figure (NF) of an optical amplifier such as EDFA applied to an optical transmission system has a wavelength dependency, the inventor has found it possible to lower fluctuations in S/N ratio according to the correlation between this wavelength dependency and the transmission length. Namely, as a signal multiplexing section is located farther from an optical amplifier, the signal light power fed into the optical amplifier becomes lower due to transmission loss. In response thereto, the respective signal wave lengths of signal light components having wavelengths different from each other multiplexed at their corresponding signal multiplexing sections in the above-mentioned optical transmission system and method are set so as to become a signal wavelength with a lower noise figure as the signal multiplexing section is located farther (on the upstream side) from the optical amplifier.

Here, at the signal wavelength of signal light component having a lower input signal light power, the noise light occurring therefrom similarly becomes lower. Therefore, fluctuations in S/N ratio among individual signal light components can be reduced in a simple manner at a low cost without complicating the system configuration of optical transmission system and the device configuration of optical amplifier.

The present invention also provides an optical transmission system comprising: (1) an optical transmission line through which a plurality of signal light components having wavelengths different from each other included in a predetermined wavelength band are transmitted; (2) a plurality of optical amplifiers, installed on the optical transmission line, each having a wavelength-dependent noise figure; (3) a first multiplexing station having a first signal multiplexing section installed upstream the plurality of optical amplifiers in a signal light propagating direction, and first signal light outputting means for outputting a first signal light component multiplexed at the first signal multiplexing section; (4) a second multiplexing station having a second signal multiplexing section installed between the plurality of optical amplifiers or installed upstream the plurality of optical amplifiers but downstream the first signal multiplexing section, and second signal light outputting means for outputting a second signal light component multiplexed at the second signal multiplexing section; and (5) a receiving station, installed downstream the plurality of optical amplifiers, for receiving the first signal light component having a first signal wavelength multiplexed at the first signal multiplexing section and the second signal light component having a second signal wavelength multiplexed at the second signal multiplexing section; wherein (6) the first signal light outputting means outputs the first signal light component having the first signal wavelength set such that the noise figure between the first signal multiplexing section and the receiving station is lower than that of the second signal wavelength.

The present invention also provides an optical transmission method applied to an optical transmission system comprising: (1) an optical transmission line through which a plurality of signal light components having wavelengths different from each other included in a predetermined wavelength band are transmitted; (2) a plurality of optical amplifiers, installed on the optical transmission line, each having a wavelength-dependent noise figure; (3) a first signal multiplexing section, installed upstream the plurality of optical amplifiers in a signal light propagating direction, for multiplexing a first signal light component; (4) a second signal multiplexing section, installed between the plurality of optical amplifiers or installed upstream the plurality of optical amplifiers but downstream the first signal multiplexing section, for multiplexing a second signal light component; and (5) a receiving station, installed downstream the plurality of optical amplifiers, for receiving the first signal light component having a first signal wavelength multiplexed at the first signal multiplexing section and the second signal light component having a second signal wavelength multiplexed at the second signal multiplexing section; wherein (6) the first signal light component having the first signal wavelength whose noise figure between the first signal multiplexing section and the receiving station is lower than that of the second signal wavelength is selectively assigned as the signal light component multiplexed at the first signal multiplexing section.

In the case where a plurality of optical amplifiers exist between a receiving station for receiving the multiplexed signal light and a signal multiplexing section, fluctuations in S/N ratio can similarly be reduced by use of the correlation between the wavelength dependency of noise figure and the transmission length to the receiving station. In this case, as mentioned above, noise figures are compared concerning the first and second signal wavelengths at the first and second signal multiplexing sections where the signal light components received at the same receiving station are multiplexed, and the signal light components to be multiplexed are selected such that the signal wavelength with a lower noise figure is set at the signal multiplexing section on the upstream side.

This setting method is similarly applicable regardless of whether or not a plurality of optical amplifiers are partly interposed between the first and second signal multiplexing sections. Here, the noise figure between the first signal multiplexing section and the receiving station refers to the sum of the respective noise figures of the plurality of optical amplifiers installed between the first signal multiplexing section and the receiving station.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the optical transmission system and method in accordance with the present invention will be explained in detail with reference to the drawings. In the explanation of drawings, elements identical to each other will be referred to with numerals identical to each other without repeating their overlapping descriptions. Proportions of dimensions in the drawings do not always match those explained.

Figure 1:
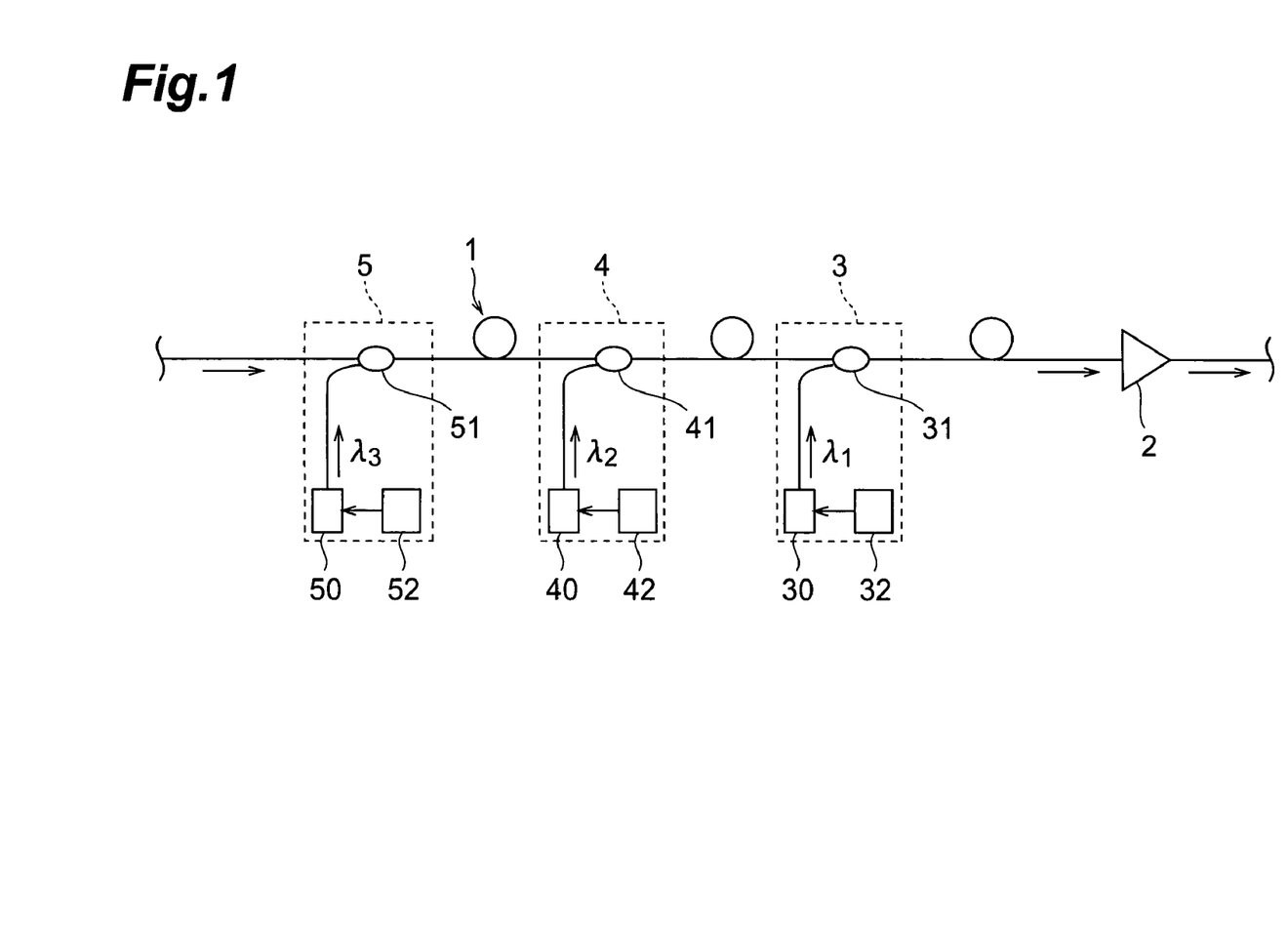
FIG. 1 is a block diagram showing a first embodiment of the optical transmission system.

FIG. 1 is a block diagram showing a first embodiment of the optical transmission system in accordance with the present invention. This optical transmission system is a wavelength division multiplexing transmission system through which multiple-wavelength signal light constituted by a plurality of signal light components having wavelengths different from each other included in a predetermined wavelength band is transmitted; and is constituted by an optical transmission line 1 using an optical fiber line. Installed on this optical transmission line 1 is an EDFA (Er-doped fiber amplifier) 2 as an optical amplifier for compensating for the transmission loss of the multiple-wavelength signal light transmitted.

Also, this optical transmission system is a multi-drop system in which signal light components are transmitted through the optical transmission line 1 while successively being multiplexed or demultiplexed at respective signal multiplexing or demultiplexing sections. In the optical transmission system shown in FIG. 1, three multiplexing stations (child stations) 3 to 5 are installed on the optical transmission line 1 on the upstream side connected to the input end of EDFA 2 in the order of multiplexing stations 3, 4, 5 from the side closer to the EDFA 2. Each of the multiplexing stations 3, 4, 5 has a signal multiplexing section installed on the optical transmission line 1, and at least one signal light outputting means for outputting the signal light component multiplexed at the signal multiplexing section.

The multiplexing station 3 has a transmitter 30 acting as the signal light outputting means, and a signal multiplexing section 31. The transmitter 30 is set so as to output a signal light component having a signal wavelength $\lambda_1$. The signal light component having the signal wavelength $\lambda_1$ is multiplexed with the multiple-wavelength signal light in the optical transmission line 1 by the signal multiplexing section 31, so as to be transmitted toward the EDFA 2. The multiplexing stations 4, 5 similarly have transmitters 40, 50 set so as to output signal light components having signal wavelengths $\lambda_2$, $\lambda_3$, and signal multiplexing sections 41, 51.

Here, the signal wavelengths $\lambda_1$, $\lambda_2$, $\lambda_3$ are set to wavelengths different from each other.

Preferably, an optical ADM (Add-Drop Multiplexer) is used as the signal multiplexing sections 31, 41, 51. The optical ADM is excellent in wavelength selectivity, and can multiplex signal light without attenuating the signal light transmitted therethrough even if the multiple-wavelength signal light has narrow wavelength intervals. WDM couplers are may also be used preferably. The WDM couplers are inexpensive, small in size, and easy to handle, while being able to suppress the attenuation of signal light to a low level.

Figure 2:
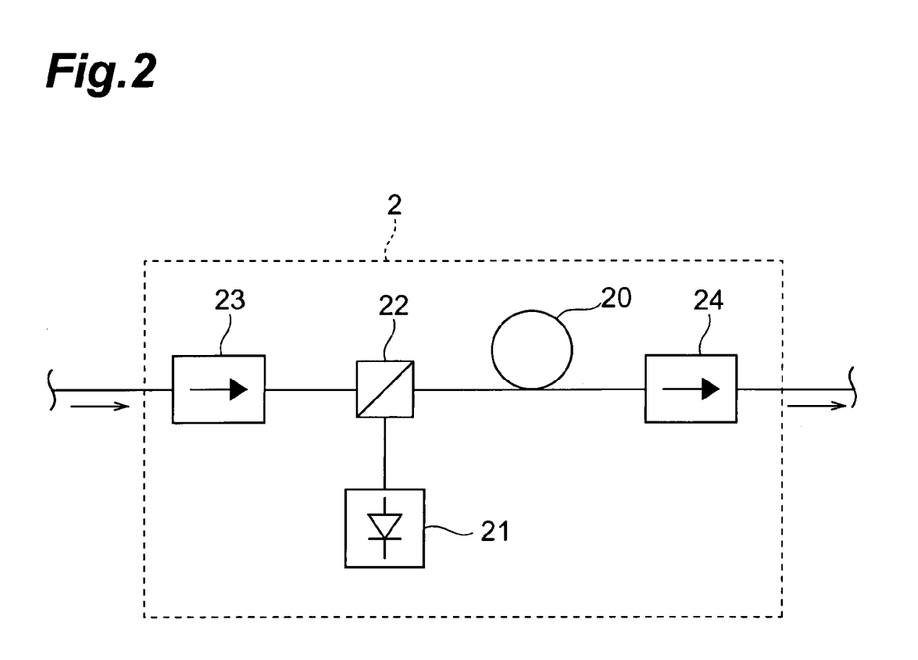
FIG. 2 is a block diagram showing an example of Er-doped fiber amplifier acting as an optical amplifier.

FIG. 2 is a block diagram showing an example of EDFA 2 employed as the optical amplifier in the wavelength division multiplexing optical transmission system shown in FIG. 1.

This EDFA 2 is constituted by an EDF (Er-doped optical fiber) 20, a pumping light source 21, a WDM coupler 22, and two optical isolators 23, 24. The EDF 20 is a silica type optical fiber doped with Er element. When pumping light having a predetermined wavelength is being supplied to the EDF 20, the latter optically amplifies input light included in a predetermined optical amplification wavelength band, and outputs thus amplified light.

Each of the optical isolators 23, 24 transmits therethrough light in a forward direction but not in the opposite direction. Namely, the optical isolator 23 transmits therethrough toward the EDF 20 the signal light fed into the EDFA 2 but does not transmit light in the opposite direction. On the other hand, the optical isolator 24 outputs the signal light from the EDF 20 to the outside of the EDFA 2 but does not transmit the light therethrough in the opposite direction.

The pumping light to the EDF 20 is supplied by the pumping light source 21. The pumping light source 21 is connected to the optical fiber line by way of the WDM coupler 22. Here, the WDM coupler 22 transmits therethrough toward the EDF 20 the pumping light having reached there from the pumping light source 21 and the signal light having reached there from the optical isolator 23. Thus, the EDFA 2 acts as an optical amplifier of a front pumping (forward pumping) configuration.

In the optical transmission system mentioned above, the lengths (transmission lengths) of optical transmission line 1 from the signal multiplexing sections 31, 41, 51 to the input end of EDFA 2 differ from each other for the respective multiplexing stations 3, 4, 5. Therefore, the magnitude of transmission loss before the input end of EDFA 2 varies among the signal light components multiplexed at the respective multiplexing sections 31, 41, 51. Namely, since the transmission loss in the optical transmission line 1 becomes higher as the transmission length increases, the transmission loss with respect to the signal light having a signal wavelength A multiplexed at the signal multiplexing section 31 closest to the EDFA 2 is the lowest. Also, the transmission loss increases in the order of the signal light component having a signal wavelength $\lambda_2$ multiplexed at the signal multiplexing section 41 and the signal light component having a signal wavelength $\lambda_3$ multiplexed at the signal multiplexing section 51, whereby the input signal light power to the EDFA 2 successively decreases.

On the other hand, the EDFA 2 acting as the optical amplifier for amplifying these signal light components has a wavelength dependency in its noise figure (NF) which represents the magnitude of noise light (N: Noise) occurring in the EDFA 2 upon optical amplification (see Japanese Patent Application Laid-Open No. HEI 9-5212). Namely, the noise light power occurring after optical amplification varies depending on the signal wavelength of signal light (S: Signal).

In the amplified light outputted from the EDFA 2, in view of the foregoing, the relationship between the power of output signal lights obtained upon optical amplification of input signal light and the power of noise light N at the signal wavelength of signal light is influenced by two factors, i.e., the transmission length from the signal multiplexing sections 31, 41, 51 and the noise figure of EDFA 2. Here, the S/N ratio, which is the ratio of signal light power to noise light power in the amplified light, may vary depending on the signal wavelength among the individual signal light components included in the multiple-wavelength signal light. In particular, depending on the combination of transmission length and noise figure, the fluctuation in S/N ratio in amplified light may increase, so that transmission characteristics of the multiple-wavelength signal light and receiving characteristics at a receiving station after amplification may deteriorate remarkably.

In the optical transmission system and method in accordance with the present invention, in view of the problem mentioned above, the signal wavelength of signal light component multiplexed at each signal multiplexing section of a plurality of multiplexing stations installed on the optical transmission line on the input side (upstream side) of the optical amplifier is always set so as to yield a noise figure lower than that of the signal wavelength of the signal light component multiplexed at another signal multiplexing section located downstream the former signal multiplexing section in the signal light propagating direction. Here, the optical transmission system has a configuration in which a signal light component having a signal wavelength with a lower noise figure is multiplexed as the multiplexing station is farther (on the upstream side) from the optical amplifier.

The configuration of the optical transmission system in accordance with the above-mentioned embodiment and its optical transmission method will be explained specifically with the aid of the graphs shown in FIGS. 3A to 3C while referring to FIG. 1. Here, the abscissa of each graph of FIGS. 3A to 3C indicates signal wavelength $\lambda$.

Figure 3A:
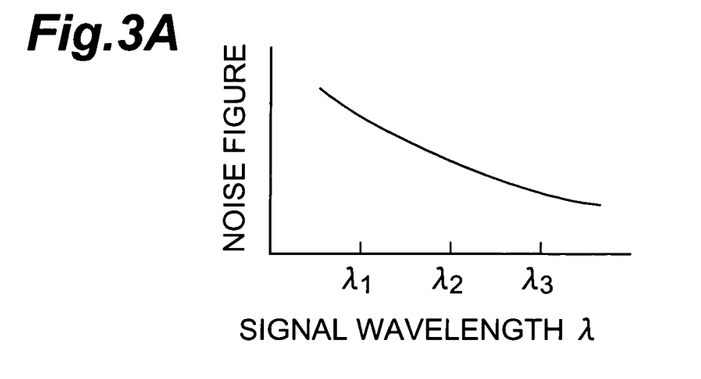
FIGS. 3A to 3C are graphs representing an optical transmission method in the optical transmission system shown in FIG. 1.
Figure 3B:
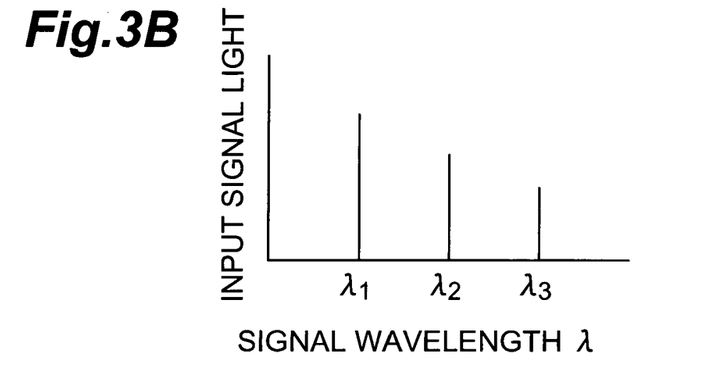

FIG. 3A shows an example of wavelength dependency of noise figure (NF) occurring in the EDFA 2. This example exhibits a characteristic in which the noise figure decreases as the waveleng this longer. For such a wavelength dependency, the signal wavelengths $\lambda_1, \lambda_2, \lambda_3$ of signal light components multiplexed at the respective signal multiplexing sections 31, 41, 51 are selectively assigned so as to satisfy $\lambda_1 < \lambda_2 < \lambda_3$. Namely, the signal wavelengths $\lambda_1, \lambda_2, \lambda_3$ Of signal light components outputted from the respective transmitters (signal light outputting means) 30, 40, 50 are set so as to satisfy $\lambda_1 < \lambda_2 < \lambda_3$. Here, as shown in FIG. 3A, the noise figure in the EDFA 2 is the highest for the signal light component at $\lambda_1$ and successively decreases at $\lambda_2$ and $\lambda_3$. on the other hand, according to the positional relationship between the EDFA 2 and the individual multiplexing sections 31, 41, 51, the transmission length of individual signal light component before being fed into the EDFA 2 is the shortest in the signal light component at $\lambda_1$ and successively increases at $\lambda_2$ and $\lambda_3$ as shown in FIG. 1. Therefore, if the individual transmitters 30, 40, 50 output the same signal light power, then the signal light power at the input end of EDFA 2 is the highest in the signal light at $\lambda_1$, since it yields the lowest transmission loss, and successively decreases at $\lambda_2$ and $\lambda_3$ as shown in FIG. 3B. Namely, the order of magnitude of input signal light power is the same as the order of highness of noise figure in EDFA 2.

Figure 3C:
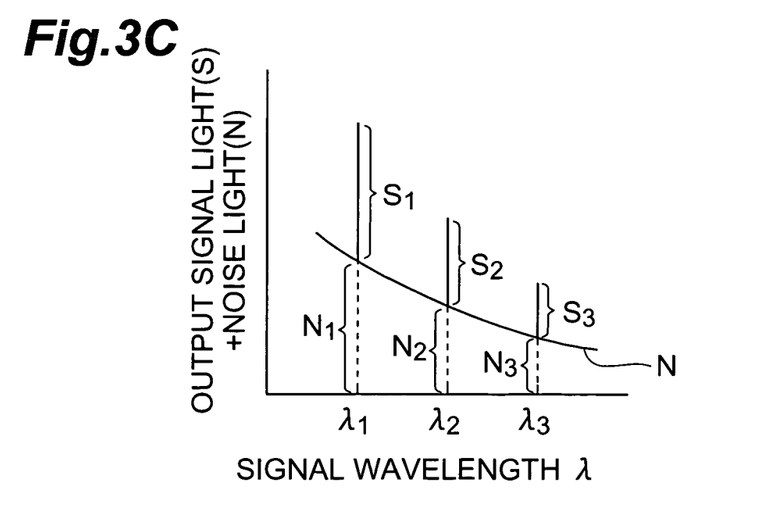

FIG. 3C shows the amplified light obtained at the output end of EDFA 2 when the above-mentioned signal wavelength setting is employed. Here, the output signal power obtained after the input signal light is optically amplified responds to the above-mentioned input signal light power, such that the power is the highest in the output signal light component $S_1$ based on the signal light component having a signal wavelength $\lambda_1$ multiplexed at the signal multiplexing section 31 and successively decreases in the output signal light component $S_2$ at $\lambda_2$, and the output signal light component $S_3$ at $\lambda_3$. On the other hand, the noise light power responds to the above-mentioned noise figure, such that the power of noise light $N_1$ at $\lambda_1$ is the highest, and successively decreases in the noise light $N_2$ at $\lambda_2$ and the noise light $N_3$ at $\lambda_3$.

According to the above-mentioned optical transmission system and method, as in the foregoing, the signal wavelengths $\lambda_1, \lambda_2, \lambda_3$ of signal light components multiplexed at the respective multiplexing stations 3, 4, 5 are set such that the power of output signal light components $S_1$, $S_2$, $S_3$ and the power of noise light components $N_1$, $N_2$, $N_3$ change in the same order. As a consequence, fluctuations among $S_1/N_1$, $S_2/N_2$, and $S_3/N_3$, which are respective S/N ratios at the individual signal wavelengths, are reduced in the amplified light obtained as the output from the EDFA 2 acting as the optical amplifier, whereby transmission characteristics of the multiple-wavelength signal light in the optical transmission system improve.

For instance, the example shown in FIG. 3C yields amplified light in which the S/N ratio is substantially identical at the individual signal wavelengths. In this case, particularly stable transmission characteristics and receiving characteristics at a receiving station after amplification are obtained.

Figure 4:
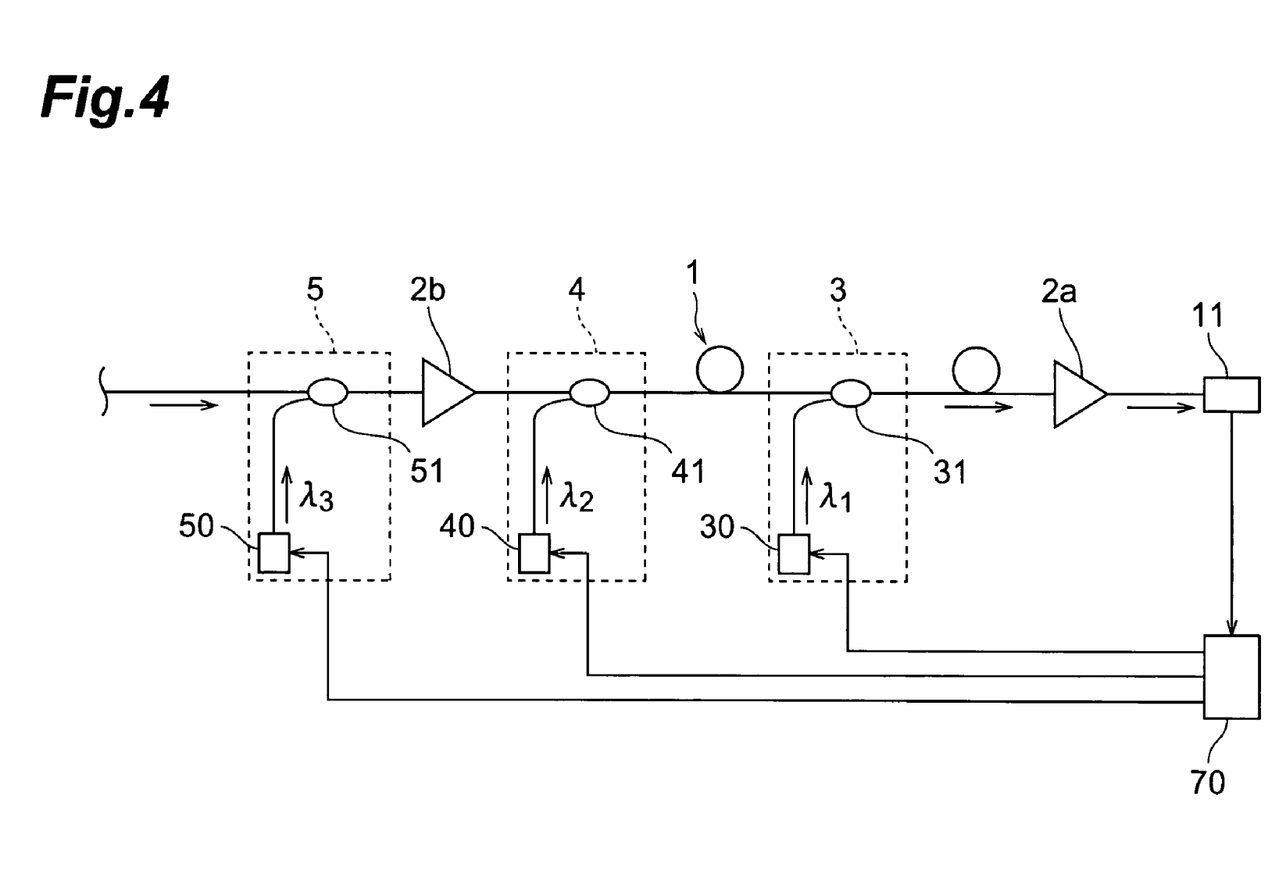
FIG. 4 is a block diagram showing a second embodiment of the optical transmission system.

FIG. 4 is a block diagram showing a second embodiment of the optical transmission system in accordance with the present invention. This optical transmission system is a multi-drop wavelength division multiplexing transmission system as with the optical transmission system shown in FIG. 1; and is constituted by an optical transmission line 1 using an optical fiber line. Installed on the optical transmission line 1 are first and second EDFAs 2a, 2b, as two optical amplifiers, in which the EDFA 2a is located on the downstream side in the signal light propagating direction.

On the optical transmission line 1 on the upstream side from the EDFA 2a, three multiplexing stations (child stations) 3 to 5 are installed in the order of multiplexing stations 3, 4, 5 from the side closer to the EDFA 2a. As with the individual multiplexing stations shown in FIG. 1, the multiplexing stations 3, 4, 5 have transmitters 30, 40, 50 for outputting signal light components having signal wavelengths $\lambda_1, \lambda_2, \lambda_3$, and signal multiplexing sections 31, 41, 51, respectively.

Among the multiplexing stations 3 to 5, the multiplexing stations 3 and 4 are disposed between the EDFA 2a and EDFA 2b. The multiplexing station 5 is disposed upstream from the EDFA 2b. Due to the configuration mentioned above, the signal light components having signal wavelengths $\lambda_1, \lambda_2, \lambda_3$ different from each other are multiplexed at the multiplexing stations 3 to 5, respectively.

A receiving station 11 for receiving signal light is installed downstream the EDFA 2a. In this embodiment, all the signal light components multiplexed at the multiplexing stations 3 to 5 are received by the single receiving station 11.

The configuration of the optical transmission system in accordance with this embodiment and its optical transmission method will be explained specifically with the aid of the graphs shown in FIGS. 5A to 5C while referring to FIG. 4. Here, the abscissa of each graph of FIGS. 5A to 5C indicates signal wavelength $\lambda$.

Figure 5A:
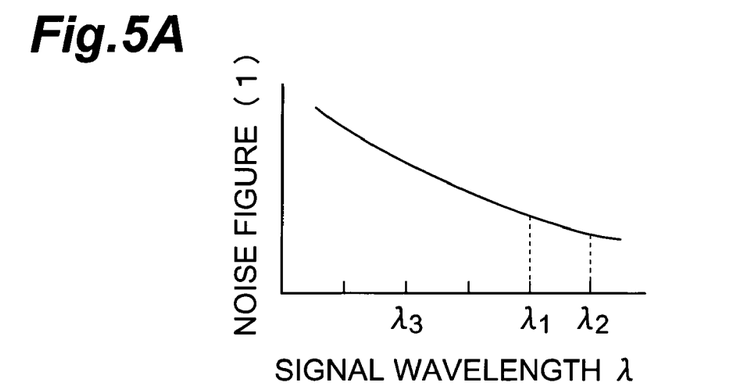
FIGS. 5A to 5C are graphs representing an optical transmission method in the optical transmission system shown in FIG. 4.

FIG. 5A shows the wavelength dependency of noise figure at the first EDFA 2a. FIG. 5B shows the wavelength dependency of noise figure at the second EDFA 2b. FIG. 5C shows the wavelength dependency of noise figure obtained when the first EDFA 2a and second EDFA 2b are combined together. Here, attention should be given to the fact that, as shown in FIG. 5C, the noise figure obtained when the EDFA 2a and EDFA 2b are combined together is not the simple sum of the respective noise figures in the EDFA 2a and EDFA 2b.

Figure 5B:
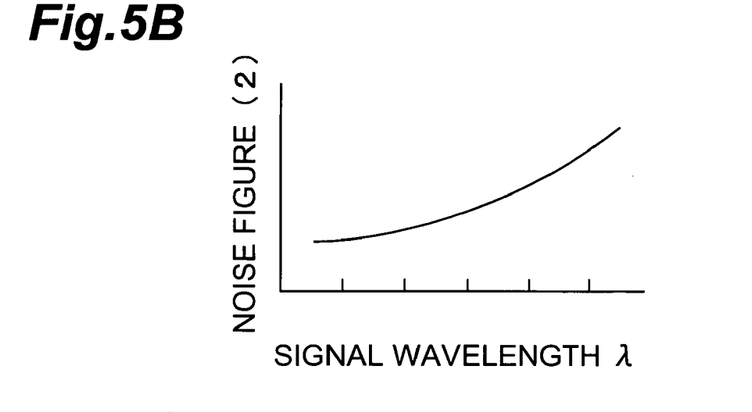
Figure 5C:
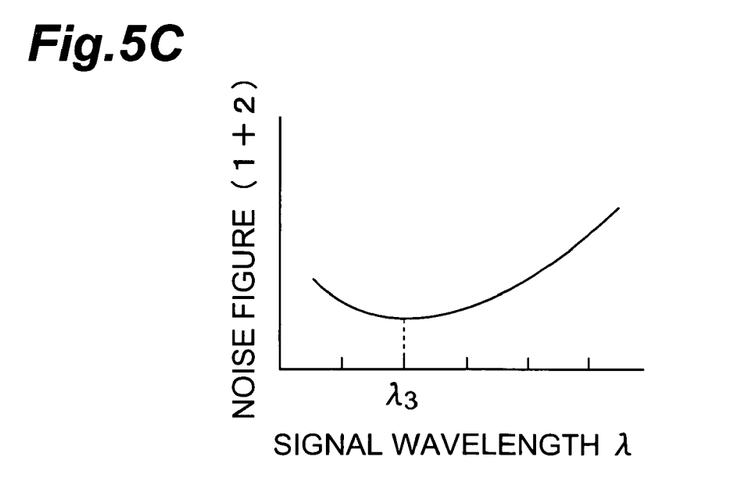

Here, for simplification, it is assumed that the respective signal wavelengths of signal light components multiplexed at the individual multiplexing stations 3 to 5 are selectable from the five signal wavelengths indicated on the abscissa of each graph of FIGS. 5A to 5C. It is also assumed that the signal light components are assigned by choosing their signal wavelengths successively from the multiplexing stations on the upstream side.

The wavelength dependency characteristics of noise figure in EDFAs 2a, 2b are such that their noise figures decrease and increase as the wavelength is longer, as shown in FIGS. 5A and 5B, respectively. The wavelength dependency characteristic of noise figure obtained when the EDFAs 2a and 2b are combined together is such that the noise figure is minimized at a predetermined wavelength within the signal wavelength band, as shown in FIG. 5C.

In view of these wavelength dependency characteristics of noise figure, the first signal wavelength of the first signal light component multiplexed at each signal multiplexing section (first signal multiplexing section) is selectively assigned such that its noise figure between the first signal multiplexing section and the receiving station becomes lower than that of the second signal wavelength of the second signal light component multiplexed at another signal multiplexing section (second signal multiplexing section) located downstream thereof, so as to set the signal wavelength of the signal light component outputted from the transmitter at each multiplexing station. As a consequence, fluctuations in S/N ratio of signal light components are reduced.

First, at the multiplexing station 5, two optical amplifiers of the first and second EDFAs 2a, 2b are installed between the multiplexing station 5 and the receiving station 11. Therefore, the signal wavelength $\lambda_3$ of the signal light component multiplexed at the multiplexing station 5 is set according to the noise figure obtained when the EDFAs 2a, 2b are combined together as shown in FIG. 5C. In this wavelength dependency characteristic, the noise figure is the lowest at the second signal wavelength from the shorter wavelength side among the five signal wavelengths that can be multiplexed, whereby this signal wavelength is chosen as the signal wavelength $\lambda_3$. Here, the signal wavelength $\lambda_3$ is set such that the noise figure between the multiplexing station 5 and the receiving station 11 is lower than that of any of the signal wavelengths $\lambda_2$, $\lambda_1$ multiplexed at the respective multiplexing stations 4, 3 located downstream the multiplexing station 5.

At the multiplexing stations 4, 3, only one optical amplifier, i.e., the first EDFA 2a, is installed between the multiplexing station 4, 3 and the receiving station 11. Therefore, the signal wavelengths $\lambda_2$, $\lambda_1$ of signal light components multiplexed at the respective multiplexing stations 4, 3 are set according to the noise figure of EDFA 2a shown in FIG. 5A. At the multiplexing station 4, the noise figure at the signal wavelength on the longest wavelength side is the lowest among the four signal wavelengths that can be multiplexed excluding the signal wavelength $\lambda_3$ that has already been selected on the upstream side, whereby this longest wavelength is chosen as the signal wavelength $\lambda_2$. At the multiplexing station 3, the noise figure at the second longest signal wavelength is the lowest among the three signal wavelengths that can be multiplexed excluding the signal wavelengths $\lambda_3$, $\lambda_2$, whereby this second longest signal wavelength is chosen as the signal wavelength $\lambda_1$.

As in the foregoing, if the signal wavelengths $\lambda_1$ to $\lambda_3$ multiplexed at the respective multiplexing stations 3 to 5 are assigned according to the wavelength dependency of noise figure between each multiplexing station and the receiving station 11, then fluctuations in S/N ratio among the individual signal light components received by the receiving station 11 can be reduced. Here, as mentioned above, the respective signal wavelengths of signal light components multiplexed at the multiplexing stations are assigned from those not multiplexed at the multiplexing stations located upstream thereof among the selectable signal wavelengths.

Figure 6:
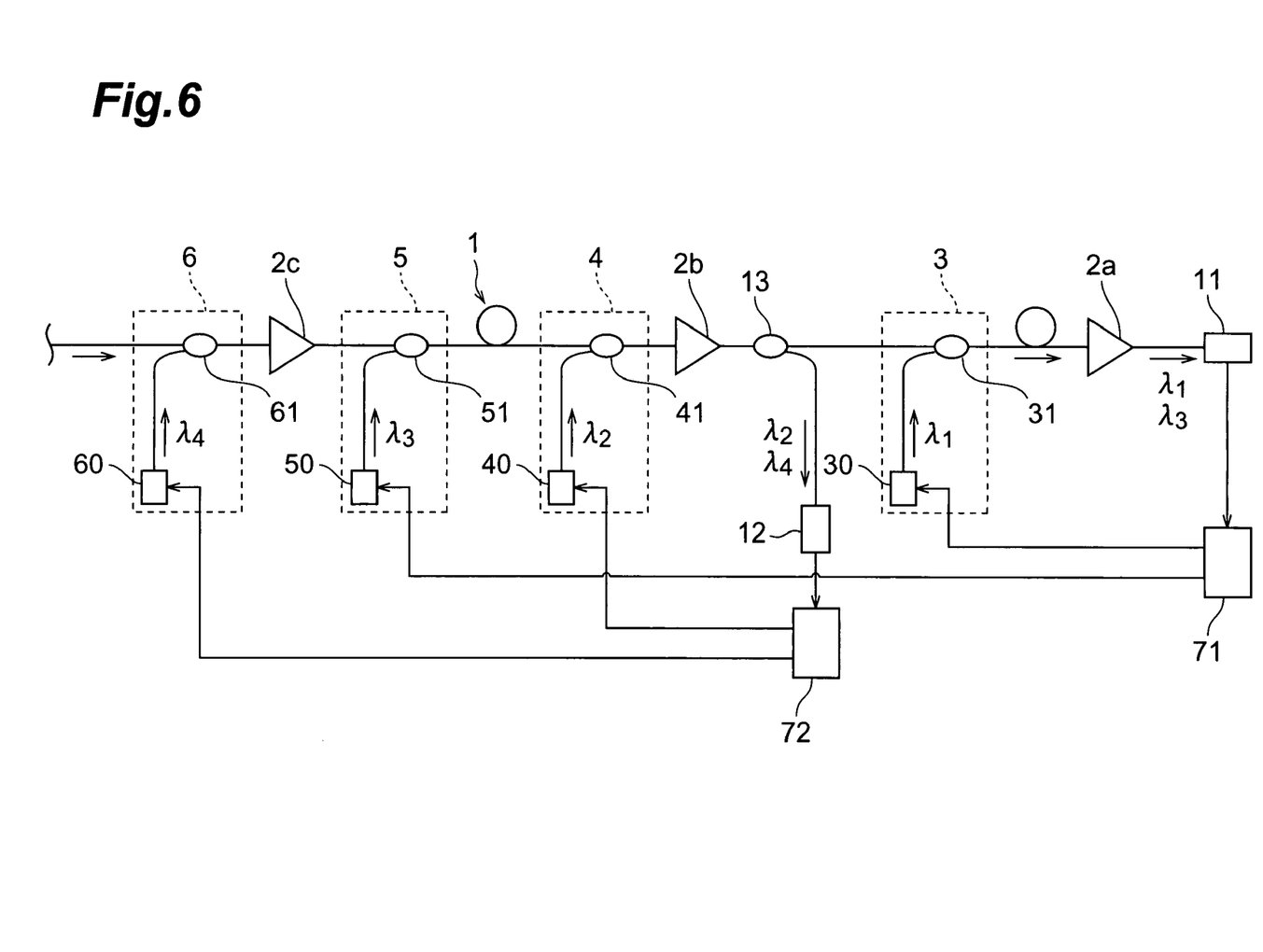
FIG. 6 is a block diagram showing a third embodiment of the optical transmission system.

FIG. 6 is a block diagram showing a third embodiment of the optical transmission system in accordance with the present invention. Installed on the optical transmission line 1 of this optical transmission system are first to third EDFAs 2a to 2c, as three optical amplifiers, in the order of EDFAs 2a, 2b, 2c from the downstream side in the signal light propagating direction.

On the optical transmission line 1 on the upstream side from the EDFA 2a, four multiplexing stations (child stations) 3 to 6 are installed in the order of multiplexing stations 3, 4, 5, 6 from the side closer to the EDFA 2a. As with the individual multiplexing stations shown in FIG. 1, the multiplexing stations 3, 4, 5, 6 have transmitters 30, 40, 50, 60 for outputting signal light components having signal wavelengths $\lambda_1$, $\lambda_2$, $\lambda_3$, $\lambda_4$ and signal multiplexing sections 31, 41, 51, 61, respectively.

Among the multiplexing stations 3 to 6, the multiplexing station 3 is disposed between the EDFA 2a and EDFA 2b. The multiplexing stations 4 and 5 are disposed between the EDFA 2b and EDFA 2c. The multiplexing station 6 is disposed upstream from the EDFA 2c. Due to the configuration mentioned above, the signal light components having signal wavelengths $\lambda_1$, $\lambda_2$, $\lambda_3$, $\lambda_4$ different from each other are multiplexed at the multiplexing stations 3 to 6, respectively.

A first receiving station 11 is installed downstream the EDFA 2a. A signal demultiplexing section 13 is disposed on the optical transmission line 1 between the multiplexing station 3 and the EDFA 2b, whereas a second receiving station 12 is installed on the optical transmission line branching off from the optical transmission line 1 at the signal demultiplexing section 13. In this embodiment, the signal light components having signal wavelengths $\lambda_1$, $\lambda_3$ multiplexed at the respective multiplexing stations 3, 5 are received by the first receiving station 11, whereas the signal light components having signal wavelengths $\lambda_2$, $\lambda_4$ multiplexed at the respective multiplexing stations 4, 6 are received by the second receiving station 12.

The configuration of the optical transmission system in accordance with this embodiment and its optical transmission method will be explained specifically with the aid of the graphs shown in FIGS. 7A to 7D while referring to FIG. 6. Here, the abscissa of each graph of FIGS. 7A to 7D indicates signal wavelength $\lambda$.

Here, for simplification, it is assumed that the respective signal wavelengths of signal light components multiplexed at the individual multiplexing stations 3 to 6 are selectable from five signal wavelengths as in the example shown in FIGS. 5A to 5C. It is also assumed that the signal light components are assigned by choosing their signal wavelengths successively from the multiplexing stations on the upstream side.

The method of setting the signal wavelengths of signal light components multiplexed in this embodiment is basically the same as that in the second embodiment. Namely, for the respective wavelength dependency characteristics of noise figure, the signal wavelength of the signal light component multiplexed at each multiplexing station is selectively assigned such that its noise figure between this multiplexing station and the receiving station becomes lower than that of the signal wavelength of the signal light component multiplexed at another multiplexing station located downstream thereof, so as to set the signal wavelength of the signal light component outputted from the transmitter at each multiplexing station.

Figure 7A:
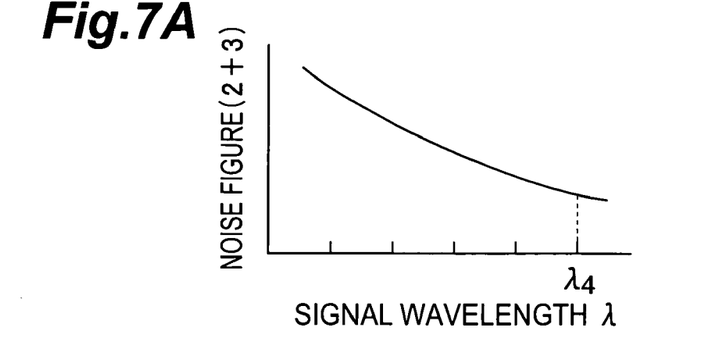
FIGS. 7A to 7D are graphs representing an optical transmission method in the optical transmission system shown in FIG. 6.

First, at the multiplexing station 6, two optical amplifiers of the second and third EDFAs 2b, 2c are installed between the multiplexing station 6 and the second receiving station 12. Therefore, the signal wavelength $\lambda_4$ of the signal light component multiplexed at the multiplexing station 6 is set according to the noise figure obtained when the EDFAs 2b, 2c are combined together as shown in FIG. 7A. Thus, the signal wavelength on the longest wavelength side exhibiting the lowest noise figure among the five signal wavelengths that can be multiplexed is chosen as the signal wavelength $\lambda_4$.

Figure 7B:
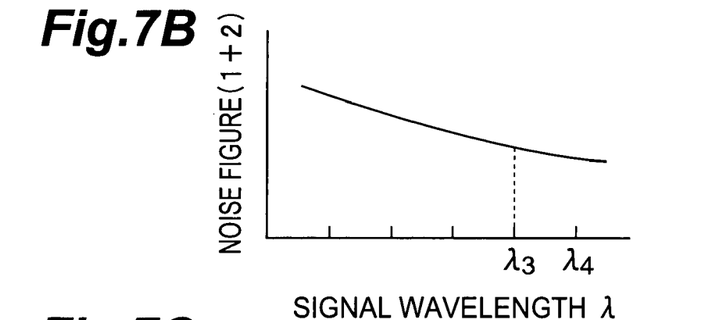

At the multiplexing station 5, two optical amplifiers of the first and second EDFAs 2a, 2b are installed between the multiplexing station 5 and the first receiving station 11. Therefore, the signal wavelength $\lambda_3$ of the signal light component multiplexed at the multiplexing station 5 is set according to the noise figure obtained when the EDFAs 2a, 2b are combined together as shown in FIG. 7B. Thus, the second longest signal wavelength exhibiting the lowest noise figure among the four signal wavelengths that can be multiplexed excluding the signal wavelength $\lambda_4$ is chosen as the signal wavelength $\lambda_3$.

At the multiplexing station 4, only one optical amplifier, i.e., the second EDFA 2b, is installed between the multiplexing station 4 and the second receiving station 12. Therefore, the signal wavelength $\lambda_2$ of the signal light component multiplexed at the multiplexing station 4 is set according to the noise figure of EDFA 2b shown in FIG. 7C. Thus, the signal wavelength at the center exhibiting the lowest noise figure among the three signal wavelengths that can be multiplexed excluding the signal wavelengths $\lambda_4, \lambda_3$ is chosen as the signal wavelength $\lambda_2$.

At the multiplexing station 3, only one optical amplifier, i.e., the first EDFA 2a, is installed between the multiplexing station 3 and the first receiving station 11. Therefore, the signal wavelength $\lambda_1$ of the signal light component multiplexed at the multiplexing station 3 is set according to the noise figure of EDFA 2a shown in FIG. 7D. Thus, the shortest signal wavelength exhibiting the lowest noise figure between the two signal wavelengths that can be multiplexed excluding the signal wavelengths $\lambda_4, \lambda_3, \lambda_2$ is chosen as the signal wavelength $\lambda_1$.

As in the foregoing, if the signal wavelengths $\lambda_1$ to $\lambda_4$ multiplexed at the respective multiplexing stations 3 to 6 are assigned according to the wavelength dependency of noise figure between each multiplexing station and the receiving station 11 or 12, then fluctuations in S/N ratio among the individual signal light components received by the receiving station 11, 12 can be reduced.

Figure 7C:
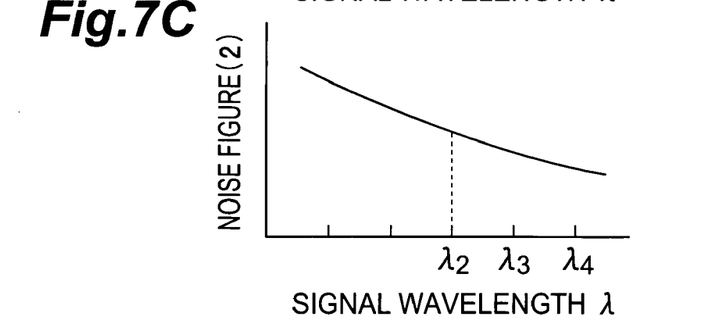
Figure 7D:
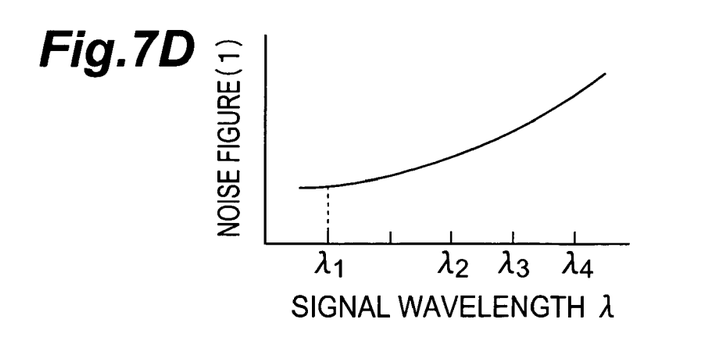

Namely, if the respective signal wavelengths $\lambda_3, \lambda_1$ of signal light components multiplexed at the multiplexing stations 5, 3 are set as shown in FIGS. 7B and 7D, then the fluctuation in S/N ratio between the signal light components received at the first receiving station 11 is reduced. If the respective signal wavelengths $\lambda_4, \lambda_2$ of signal light components multiplexed at the multiplexing stations 6, 4 are set as shown in FIGS. 7A and 7C, on the other hand, then the fluctuation in S/N ratio between the signal light components received at the second receiving station 12 is reduced.

The above-mentioned method of setting the signal wavelength reduces fluctuations in S/N ratio among the signal light components received at each receiving station. Therefore, in the case where a plurality of receiving stations exist as in this embodiment, it will be sufficient if the signal wavelength selecting condition based on the wavelength dependency of noise figure is satisfied at least among the signal wavelengths (between the signal wavelengths $\lambda_1$ and $\lambda_3$ or between the signal wavelengths $\lambda_2$ and $\lambda_4$ in the example mentioned above) of signal light components received at the same receiving station.

The optical transmission system and method in accordance with the present invention are not restricted to the above-mentioned embodiments, whereas various modifications in configuration and alternations in settings are possible. For instance, though the respective signal wavelengths of signal light components multiplexed at the multiplexing stations in the example shown in FIGS. 3A to 3C are set according to the wavelength dependency of noise figure shown in FIG. 3A such that $\lambda_1 < \lambda_2 < \lambda_3$, if the wavelength dependency of noise figure varies, then the signal wavelengths are required to be set according to their respective wavelength dependency characteristics.

Also, multiplexing devices other than the optical ADM and WMD coupler may be employed in the signal multiplexing section. Further, for minutely adjusting the S/N ratio of amplified light, the transmitted signal light power from each transmitter may be regulated within a predetermined range.

In the optical transmission systems shown in FIGS. 1, 4, and 6, the EDFA 2 is used as the optical amplifier. The EDFA is an optical amplifier whose noise figure exhibits wavelength dependency depending on its configuration. If the signal wavelengths of signal light components to be multiplexed are set as mentioned above, then the wavelength dependency characteristic is utilized instead of flattening the noise figure, so as to reduce fluctuations in S/N ratio while sufficiently suppressing the cost, whereby transmission characteristics of multiple-wavelength signal light can be improved.

Here, optical amplifiers other than the EDFA may also be used. Examples of such optical amplifiers include those using optical fibers doped with rare-earth elements such as Pr and Nd, and semiconductor optical amplifiers.

The optical transmission systems shown in FIGS. 1, 4, and 6 use a transmitter (light source) as the signal light outputting means installed at each multiplexing station. In the case where a signal light component inputted from another optical transmission system is multiplexed at a given signal multiplexing section, then such a transmitter corresponds to one installed in the optical transmission system. In another possible configuration, a wavelength converting device for converting the signal light inputted from another optical transmission system into signal light having a predetermined signal wavelength and outputting thus converted signal light may be installed as signal light outputting means.

Also, the signal wavelength of signal light component multiplexed at each multiplexing station (signal multiplexing section) can be set and adjusted by an operator according to the selecting conditions mentioned above.

The signal light outputting means such as the transmitter or wavelength converting device installed in each multiplexing station may be provided with signal wavelength indicating means for indicating the setting of signal wavelength according to the noise figure. If the signal wavelength indicating means is installed as such, and the signal wavelength of signal light component multiplexed at each multiplexing station is set automatically or manually with the aid of the signal wavelength indicating means, then the setting of signal wavelength can be controlled actively.

A possible application of such signal wavelength indicating means is, for example, a configuration shown in FIG. 1 in which signal wavelength indicating devices 32, 42, 52 for indicating the settings of signal wavelengths with respect to the transmitters 30, 40, 50 are installed in the multiplexing stations 3, 4, 5, respectively.

In another possible configuration, as shown in FIG. 4, a single signal wavelength indicating device 70 may be installed for indicating the respective settings of signal wavelengths with respect to the transmitters 30, 40, 50. In the configuration of FIG. 4, the signal wavelength indicating device 70 is connected to the receiving station 11. As a consequence, the individual transmitters 30, 40, 50 can be subjected to feedback control by way of the signal wavelength indicating device 70 according to the information concerning each signal light component received at the receiving station 11 or the like.

FIG. 6 shows a configuration in which two signal wavelength indicating devices 71, 72 are installed. In this configuration, the transmitters 30, 50 are subjected to feedback control by the signal wavelength indicating device 71 connected to the first receiving station 1 that receives the signal light components having signal wavelengths $\lambda_1, \lambda_3$ multiplexed at the respective multiplexing stations 3, 5. On the other hand, the transmitters 40, 60 are subjected to feedback control by the signal wavelength indicating device 72 connected to the second receiving station 12 that receives the signal light components having signal wavelengths $\lambda_2, \lambda_4$ multiplexed at the respective multiplexing stations 4, 6.

As explained in detail in the foregoing, the optical transmission system and method in accordance with the present invention can be utilized as those which can reduce fluctuations in S/N ratio (ratio of output signal light power/noise light power) among signal light components in multiple-wavelength signal light amplified by optical amplifiers on an optical transmission line.

Namely, in an optical transmission system in which, for one or a plurality of optical amplifiers disposed on an optical transmission line, signal light components having signal wavelengths different from each other are multiplexed from respective signal multiplexing sections installed on the input side (upstream side) thereof, the signal light component multiplexed at each signal multiplexing section is always set to a signal wavelength exhibiting a lower noise figure at the optical amplifier as compared with the signal light component multiplexed at a signal multiplexing section located downstream thereof in the signal light propagating direction.

Thus attained are an optical transmission system and method which reduce fluctuations in S/N ratio among signal light components having respective signal wavelengths in the amplified light obtained as the output from the optical amplifier or the light received by the receiving station installed downstream the optical amplifier. Such an optical transmission system and method reduce fluctuations in S/N ratio by utilizing the wavelength dependency of noise figure instead of adding thereto an apparatus configuration for flattening noise figure to the optical amplifier, for example, and thereby complicating the system configuration. Therefore, transmission characteristics of multiple-wavelength signal light can be improved while the cost of system is kept low.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transmission system comprising:
    an optical transmission line through which a plurality of signal light components having wavelengths different from each other included in a predetermined wavelength band are transmitted;
    an optical amplifier, installed on said optical transmission line, having a wavelength-dependent noise figure; and
    a plurality of multiplexing stations each constituted by a signal multiplexing section installed on said optical transmission line connected to an input end side of said optical amplifier, and at least one signal light outputting means for outputting a signal light component multiplexed at said signal multiplexing section;
    wherein, between two of said multiplexing stations adjacent each other, said signal light outputting means of said multiplexing station disposed upstream in a signal light propagating direction outputs a signal light component having a signal wavelength set so as to yield a noise figure lower than that of the signal wavelength of a signal light component outputted from said signal light outputting means of said multiplexing station disposed downstream.

2. An optical transmission system according to claim 1, wherein said signal multiplexing section includes an optical ADM.

3. An optical transmission system according to claim 1, wherein said signal multiplexing section includes a WDM coupler.

4. An optical transmission system according to claim 1, wherein said optical amplifier is an Er-doped fiber amplifier.

5. An optical transmission system according to claim 1, further comprising signal wavelength indicating means for indicating a setting of said signal wavelength for said signal light outputting means in each of said plurality of multiplexing stations according to said noise figure.

6. An optical transmission system comprising:
    an optical transmission line through which a plurality of signal light components having wavelengths different from each other included in a predetermined wavelength band are transmitted;
    a plurality of optical amplifiers, installed on said optical transmission line, each having a wavelength-dependent noise figure;
    a first multiplexing station having a first signal multiplexing section installed upstream said plurality of optical amplifiers in a signal light propagating direction, and first signal light outputting means for outputting a first signal light component multiplexed at said first signal multiplexing section;
    a second multiplexing station having a second signal multiplexing section installed between said plurality of optical amplifiers, and second signal light outputting means for outputting a second signal light component multiplexed at said second signal multiplexing section; and
    a receiving station, installed downstream said plurality of optical amplifiers, for receiving said first signal light component having a first signal wavelength multiplexed at said first signal multiplexing section and said second signal light component having a second signal wavelength multiplexed at said second signal multiplexing section;
    wherein said first signal light outputting means outputs said first signal light component having said first signal wavelength set such that said noise figure between said first signal multiplexing section and said receiving station is lower than that of said second signal wavelength.

7. An optical transmission system according to claim 6, wherein said signal multiplexing section includes an optical ADM.

8. An optical transmission system according to claim 6, wherein said signal multiplexing section includes a WDM coupler.

9. An optical transmission system according to claim 6, wherein said optical amplifier is an Er-doped fiber amplifier.

10. An optical transmission system according to claim 6, further comprising signal wavelength indicating means for indicating a setting of said signal wavelength for said signal light outputting means in each of said plurality of multiplexing stations according to said noise figure.

11. An optical transmission system comprising:
    an optical transmission line through which a plurality of signal light components having wavelengths different from each other included in a predetermined wavelength band are transmitted;
    a plurality of optical amplifiers, installed on said optical transmission line, each having a wavelength-dependent noise figure;
    a first multiplexing station having a first signal multiplexing section installed upstream said plurality of optical amplifiers in a signal light propagating direction, and first signal light outputting means for outputting a first signal light component multiplexed at said first signal multiplexing section;
    a second multiplexing station having a second signal multiplexing section installed upstream said plurality of optical amplifiers but downstream said first signal multiplexing section, and second signal light outputting means for outputting a second signal light component multiplexed at said second signal multiplexing section; and a receiving station, installed downstream said plurality of optical amplifiers, for receiving said first signal light component having a first signal wavelength multiplexed at said first signal multiplexing section and said second signal light component having a second signal wavelength multiplexed at said second signal multiplexing section;

wherein said first signal light outputting means outputs said first signal light component having said first signal wavelength set such that said noise figure between said first signal multiplexing section and said receiving station is lower than that of said second signal wavelength.

12. An optical transmission system according to claim 11, wherein said signal multiplexing section includes an optical ADM.

13. An optical transmission system according to claim 11, wherein said signal multiplexing section includes a WDM coupler.

14. An optical transmission system according to claim 11, wherein said optical amplifier is an Er-doped fiber amplifier.

15. An optical transmission system according to claim 11, further comprising signal wavelength indicating means for indicating a setting of said signal wavelength for said signal light outputting means in each of said plurality of multiplexing stations according to said noise figure.

16. An optical transmission method applied to an optical transmission system comprising:

an optical transmission line through which a plurality of signal light components having wavelengths different from each other included in a predetermined wavelength band are transmitted;

an optical amplifier, installed on said optical transmission line, having a wavelength-dependent noise figure; and a plurality of signal multiplexing sections installed on said optical transmission line connected to an input end side of said optical amplifier;

wherein, between two of said signal multiplexing sections adjacent each other, a signal light component having a signal wavelength with a noise figure lower than that of the signal wavelength of a signal light component multiplexed at said signal multiplexing section disposed downstream in a signal light propagating direction is selectively assigned as a signal light component multiplexed at said signal multiplexing section disposed upstream.

17. An optical transmission method applied to an optical transmission system comprising:

an optical transmission line through which a plurality of signal light components having wavelengths different from each other included in a predetermined wavelength band are transmitted;

a plurality of optical amplifiers, installed on said optical transmission line, each having a wavelength-dependent noise figure;

a first signal multiplexing section, installed upstream said plurality of optical amplifiers in a signal light propagating direction, for guiding a first signal light component into said optical transmission line;

a second signal multiplexing section, installed between said plurality of optical amplifiers, for guiding a second signal light component into said optical transmission line; and a receiving station, installed downstream said plurality of optical amplifiers, for receiving said first signal light component having a first signal wavelength multiplexed at said first signal multiplexing section and said second signal light component having a second signal wavelength multiplexed at said second signal multiplexing section;

wherein said first signal light component having said first signal wavelength whose noise figure between said first signal multiplexing section and said receiving station is lower than that of said second signal wavelength is selectively assigned as said signal light component multiplexed at said first signal multiplexing section.

18. An optical transmission method applied to an optical transmission system comprising:

an optical transmission line through which a plurality of signal light components having wavelengths different from each other included in a predetermined wavelength band are transmitted;

a plurality of optical amplifiers, installed on said optical transmission line, each having a wavelength-dependent noise figure;

a first signal multiplexing section, installed upstream said plurality of optical amplifiers in a signal light propagating direction, for guiding a first signal light component into said optical transmission line;

a second signal multiplexing section, installed upstream said plurality of optical amplifiers but downstream said first signal multiplexing section, for guiding a second signal light component into said optical transmission line; and a receiving station, installed downstream said plurality of optical amplifiers, for receiving said first signal light component having a first signal wavelength multiplexed at said first signal multiplexing section and said second signal light component having a second signal wavelength multiplexed at said second signal multiplexing section;

wherein said first signal light component having said first signal wavelength whose noise figure between said first signal multiplexing section and said receiving station is lower than that of said second signal wavelength is selectively assigned as said signal light component multiplexed at said first signal multiplexing section.

* * * * *